June 28, 1966  I. VON FUNK  3,258,296
PNEUMATIC MATERIAL CONVEYOR
Filed March 20, 1964  4 Sheets-Sheet 3

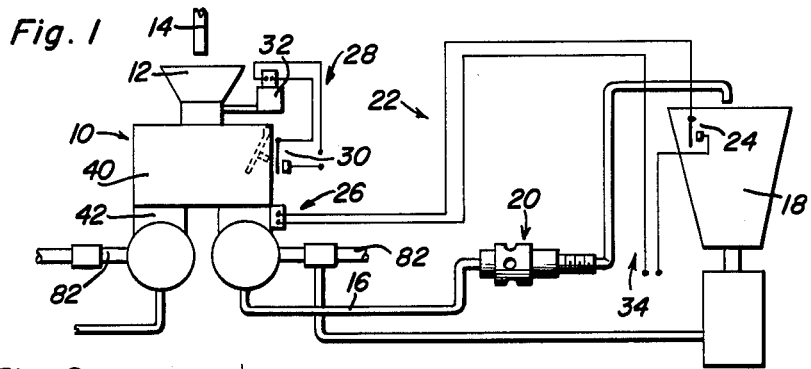
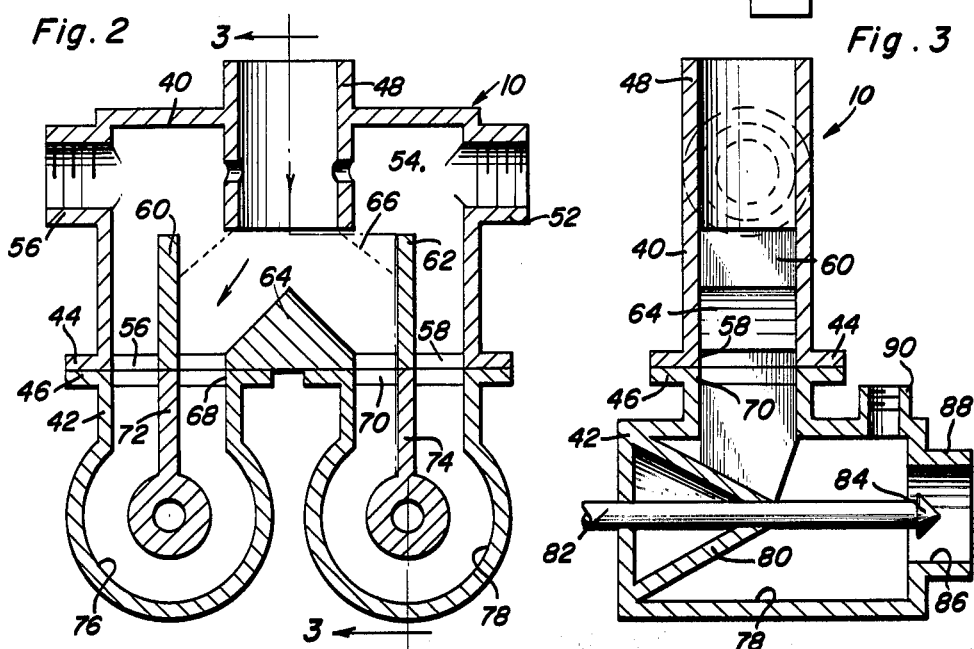
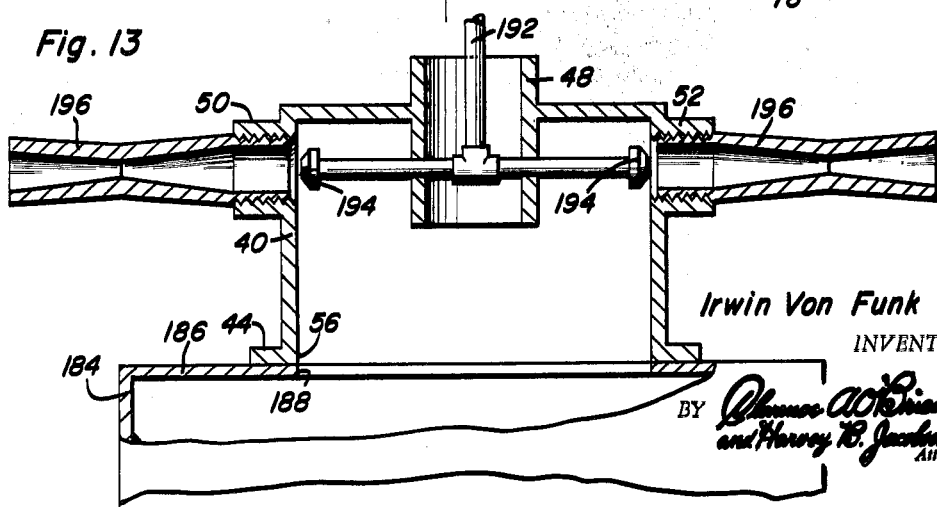
Irwin Von Funk
INVENTOR.

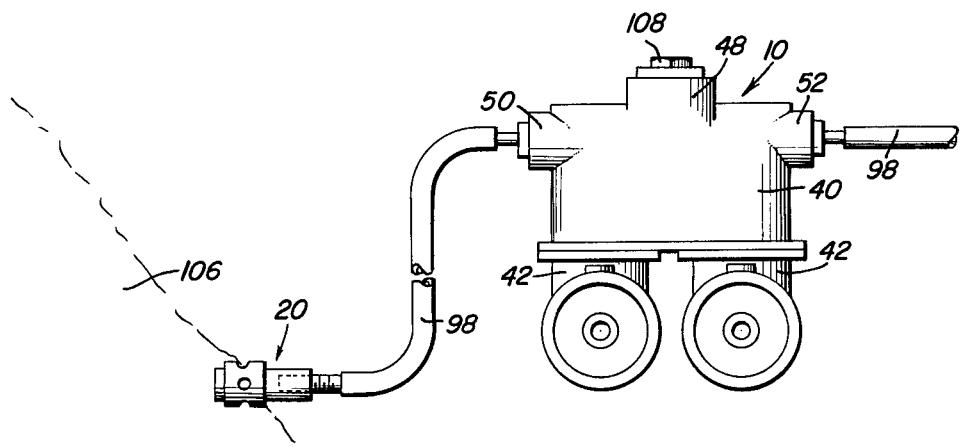
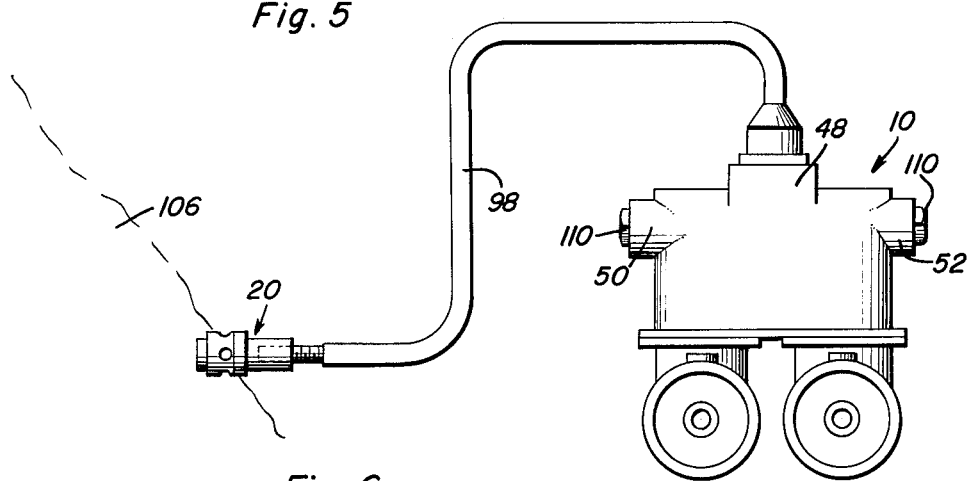
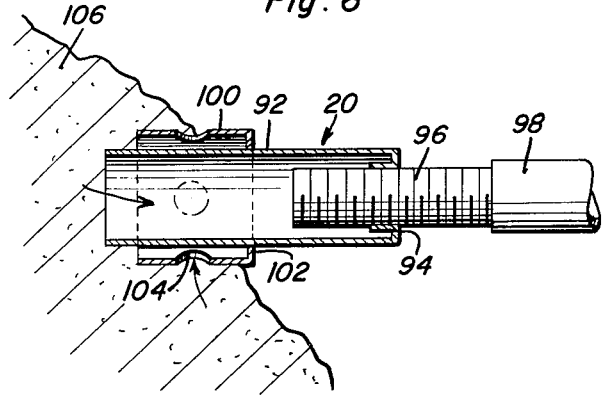
Irwin Von Funk
INVENTOR.

Irwin Von Funk
INVENTOR.

BY *Clarence A. O'Brien*
*and Harvey B. Jacobson*
Attorneys

Irwin Von Funk
INVENTOR.

United States Patent Office 3,258,296
Patented June 28, 1966

3,258,296
PNEUMATIC MATERIAL CONVEYOR
Irwin Von Funk, P.O. Box 157, Macungie, Pa.
Filed Mar. 20, 1964, Ser. No. 353,364
10 Claims. (Cl. 302—17)

This invention comprises a novel and useful pneumatic material conveyor and more particularly pertains to a device for transporting various solid granular materials by means of a conveying air stream from a source of supply to a desired ultimate destination and comprises a pneumatic conveyor system including therein novel improved components facilitating the introduction of the granular material into the conveying air stream, the separating of the material from the air stream at its destination and the like.

It is the primary object of this invention to provide a pneumatic conveyor system incorporating therein a plurality of components each contributing toward the efficiency and effectiveness of the conveyor system.

A further and more specific object of the invention is to provide a pneumatic conveyor system having therein a mixing device which will greatly facilitate and render more effective the introduction of solid granular material into a conveying air stream for transport thereby.

A further object of the invention is to provide a pneumatic conveying system in accordance with the preceding objects which shall include an improved means for separating the conveyed material from the conveying air stream at the destination of the material.

A still further purpose of the invention is to provide a pneumatic conveying system in accordance with the foregoing objects which will enable additional material to be entrained by the conveying air stream during its travel from a source of air and the ultimate destination of the material being conveyed.

A still further object of the invention is to provide a pneumatic conveying system in accordance with the foregoing objects which shall include an automatic control means responsive to the level or quantity of the solid material collected in a bin or container at the destination of the system and which will automatically initiate or halt the operation of the conveying system in accordance with the level existing within the collection means.

A still further object of the invention is to provide a pneumatic conveying system in accordance with the preceding object which shall include a means which will automatically render the system self-operative to cleanse out stoppages or blockage which may occur in the system.

An additional object of the invention is to provide an automatic pneumatic conveying system in accordance with the preceding objects which shall include remote control means whereby the operator may temporarily discontinue operation of the system at a remote location thereto.

A still further object of the invention is to provide a pneumatic conveying system in accordance with the above set forth objects which shall be equally applicable to effect the evacuation of chambers or containers.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a diagrammatic view showing a pneumatic conveying system incorporating therein various specific components of this invention;

FIGURE 2 is a view in vertical transverse section through the mixing device forming an essential feature of this invention;

FIGURE 3 is a vertical longitudinal sectional view taken substantially upon the plane indicated by the broken section line 3—3 of FIGURE 2 and showing one of the venturi jet elements of the invention;

FIGURE 4 is a view in side elevation of an aspirating device for inducting solid granular material into the mixing chamber;

FIGURE 5 is a view similar to FIGURE 4 but showing a modified construction in which the aspirating device is connected to the mixing chamber in a different manner from that of FIGURE 4;

FIGURE 6 is a view in vertical central section through the aspirating device itself of FIGURES 4 and 5;

FIGURE 13 is a view taken in vertical longitudinal section substantially upon the plane indicated by the section line 13—13 of FIGURE 12 and showing further details of the evacuating means.

Figure 12:
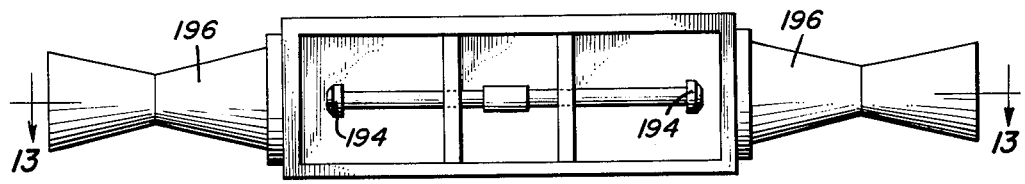
FIGURE 12 is a top plan view of a component of the invention employed for the evacuating of chambers or containers.

Reference is made first to FIGURE 1 which discloses somewhat diagrammatically the pneumatic conveyor system incorporating therein the various features of this invention. The illustrated conveying system includes a gas and solid mixing device indicated generally by the numeral 10 and which is supplied with a solid material such as that of a granulated nature by means of the hopper or funnel 12 which is supplied with solid material as by a delivery pipe 14. Conveying lines as at 16 connect the outlets of the mixing chamber with an ultimate destination for the air conveyed solid granules such as a collection receptacle 18 which also constitutes a separator for releasing the grain from the conveying air stream. An aspirating device indicated generally by the numeral 20 is shown associated with the conveying conduit 16 although it will be appreciated that it may be connected to any of the air of gas conveying lines as set forth hereinafter. A level control means indicated generally by the numeral 22 is employed to automatically control the operation of the conveying system to maintain a desired level of granular material in the collector 18, and may conveniently include a level sensing device 24 disposed within the collector chamber 18 and a control means for the system shown at 26 and connected with the mixing device. The system further includes an automatic blockage clearing means designated generally by the numeral 28 and which includes a blockage detector 30 operatively associated with the mixing device 10 and an operating means 32 connected to the detecting device and operable thereby to effect the clearing of blockages from the system. There is further provided a remote control means designated generally by the numeral 34 and by means of which an operator at a remote point may temporarily halt operation of the pneumatic conveying system as may be desired. Finally, the mixing device 10 includes attachments thereto shown particularly in FIGURES 12 and 13 by means of which the system may be converted from a solid conveying air system to a means for evacuating receptacles and containers.

I. *Pneumatic conveyor mixing device*

Referring primarily to FIGURES 2 and 3 in conjunction with FIGURE 1 it will be seen that the mixing device 10 comprises a means for effecting the introduction of solid material such as granules, grain particles or the like into an air stream to effect a suspension of the granules and a conveying of the latter from the mixing device 10 to a collecting bin or chamber 18. The mixing device comprises a housing which is horizontally divided into an upper portion 40 and a lower portion 42 which are detachably secured together as by cooperating flanges 44 and 46 retained by suitable fasteners, not shown. The upper housing 40 is provided with a vertical boss or sleeve 48 in its top wall together with a pair of internally threaded bosses 50 and 52 disposed preferably in alignment with each other in its side walls. Mounted upon the upper projecting end of the boss or sleeve 48 is a previously mentioned hopper or funnel 12 by means of which any suitable solid material of a fluid-like or granular nature is introduced into the device. Inasmuch as the apparatus is adapted for the handling of substantially all materials of a fluid-like or a granulated nature, a further description of this phase of the invention is deemed to be unnecessary.

Within the upper portion of the body is therefore provided a solid material collecting chamber 54 into which is deposited the solid material for dispensing into the lower housing 42 where it is to be introduced into and intermingled with the conveying air stream for transportation thereby.

The bottom wall of the upper housing 40 is provided with a pair of discharge openings as at 56 and 58 respectively each of which openings is divided by a vertically extending partition 60 and 62. Disposed intermediate the two partitions is a deflector or guide rib 64 having an upper knife edge. It will be noted that the upper ends of the partitions 60 and 62 project sufficiently upwardly toward the lower end of the sleeve 48 as to extend above the normal angle of repose of the solid material introduced therein and which angle of the repose is indicated by the line 66. Thus, the partitions ensure that the introduced material will be evenly divided by the deflector 64 and will pass downwardly through the inside portion of the openings 56 and 58, with air entering through the bosses 50 and 52 passing downwardly through the outside portion of the openings 56 and 58.

The lower housing 42 has complementary openings 68 and 70 which register with the openings 56 and 58 in the upper housing. In addition, the lower housing is provided with partition members 72 and 74 which respectively register with and form downward continuations of the partitions 60 and 62 of the upper housing 40.

It will be noted that the lower housing has a pair of generally cylindrical chambers 76 and 78 whose upper portions communicate with the ports 68 and 70. Disposed in each of these chambers is a conical end wall as at 80, see FIGURE 3, and which extends below the ports 68 and 70. An air supply conduit 82 extends through the conical portion 80 and has a nozzle 84 extending into the passage 86 disposed in a tubular boss or sleeve 88 projecting from the main part of the lower housing. The passage 86 in conjunction with the nozzle 84 constitutes a venturi, the actual configuration of which is of any suitable design and is not shown. Consequently, as a stream of air from any suitable source under pressure is supplied by means of the pipe 82 into the venturi member of the mixing device, there will be produced a suction effect in the chambers 76 and 78. This suction effect will draw air through the bosses 50 and 52 which air will pass downwardly through the outside passages of the ports 56, 58 and their aligned ports 68 and 70 of the lower housing section, so that this air traveling downwardly will mix with the solid material entering from the collection chamber 54 into the compartment between the two partitions 60 and 62, and being divided by the member 64 will descend from the inner portions of the aligned ports wherein it will be picked up by the conveying air stream thus introduced, delivered into the venturi jet member 88 and from thence conveyed in a conveying air stream through the conveyor conduit means 16.

Also shown in FIGURE 3 is an upstanding internally threaded boss 90 which serves as a means to admit additional air or other material into the mixing chamber of the venturi device under the control of any suitable valve or supply means, not shown.

As so far described, it will thus be apparent that air from any suitable source under pressure is applied by the pipes 82 into the venturi jet elements of the lower portion of the mixing device thereby producing a propelling air flow therethrough. Additional air from the ports in the bosses 50 and 52 together with solid material through the fluid 48 is then drawn into the mixing chamber and through the venturi element into the conveying air conduit.

Referring next to FIGURES 4–6 in conjunction with FIGURE 1 it will be observed that means are provided for aspirating or inducting other materials into the mixing chamber and/or the conduits of the pneumatic conveyor system. The aspirating device 20 is shown in FIGURE 6 as comprising a cylindrical body or sleeve 92 which is open at one end and has a closed end 94 into which is threadedly engaged the extremity 96 of a conduit or pipe 98. Surrounding the open end of the sleeve 92 is a second concentrically disposed sleeve or shell 100 which has a closure end wall 102 surrounding and by which it is secured to the sleeve 92. The two sleeves 92 and 100 have open ends which comprise the inlet ends of the device. The sleeve 100 is provided with perforations 104 therein so that the open end of the device may be inserted into a pile of material as at 106, whereupon the suction applied to the open end of the sleeve 92 and the sleeve 100 by the passage of air through the device will produce a suction or aspirating effect which will draw therein the material 106.

In the arrangement shown in FIGURE 4, the conduit 98 is shown as connected to one of the bosses such as the boss 50 of the mixing chamber housing. The other boss 52 is likewise shown provided with a suction conduit for an aspirating device in this same manner. In this arrangement, a plug as at 108 may be provided to close the inlet boss or sleeve 48 so that the mixing chamber thus draws its entire supply of solid material through one or both of the conduits 98 and the associated aspirating device 20.

In the modified arrangement of FIGURE 5, the suction conduit 98 of the aspirating device is shown connected to the sleeve 48 while the two bosses 50 and 52 are shown closed as by closure plugs 110. In this arrangement the entire supply of solid material is drawn by the aspirating device from the source 106 for mixing in the mixing chamber of the apparatus.

It will be appreciated that various arrangements of the aspirating devices with respect to the bosses 48, 50 and 52 may be provided within the spirit of this invention.

II. *Level control*

Figure 7:
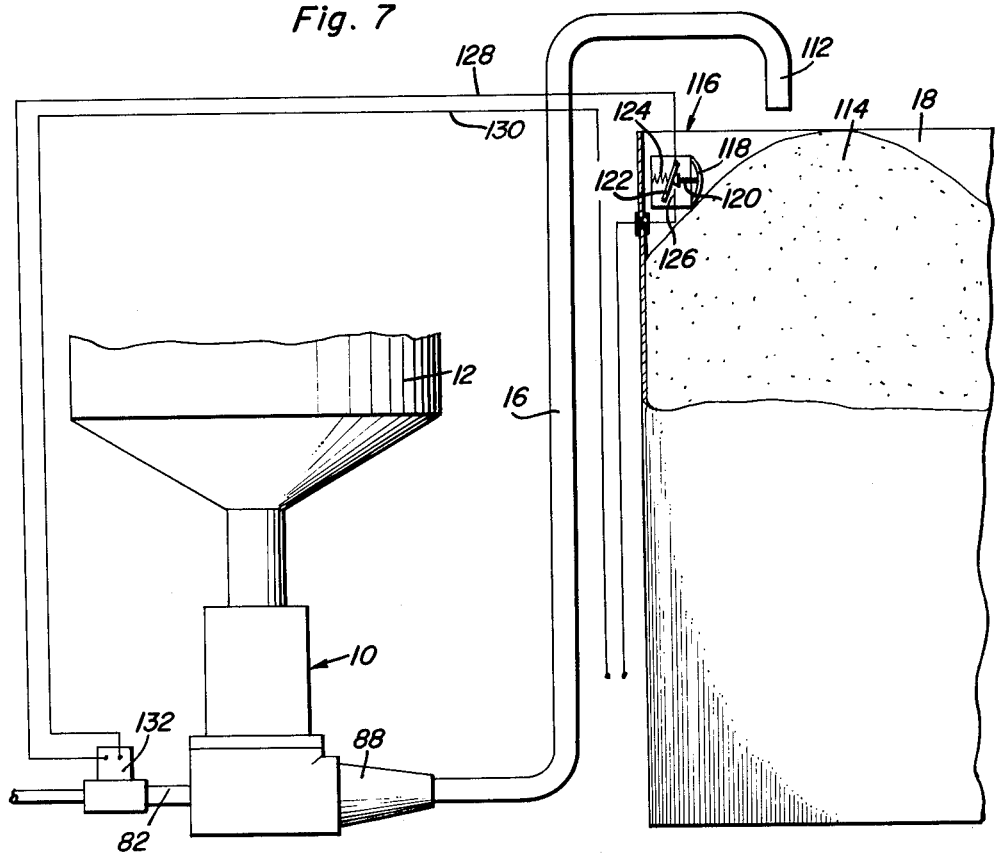
FIGURE 7 is a diagrammatic view parts being broken away and shown partly in elevation and partly in section of a portion of the system including particularly the level control means of the invention.

Referring now to FIGURE 1 in conjunction with FIGURE 7 it will be seen that the conduit 16 has its upper end as at 112 discharging into the previously mentioned solid material collecting means 18. This last-mentioned means comprises a bin, receptacle or other storage means into which the solid material is discharged by the conveying air stream to form a pile or bulk material therein as at 114. Conveniently, as shown in FIGURE 1, the uper end of the member 18 may constitute a cyclone type of separator whereby the solid material settles out of the conveying air stream, with the air escaping out of the open top of the device while the material piles up upon the bottom thereof. Indicated diagrammatically by the numeral 116 is a level detecting means disposed in the collection chamber of the collecting means 18. This detecting means may be of any desired type, preferably consisting of a diaphragm 118 carrying an actuating member 120 thereon which bears against a pivoted switch blade 122. The latter is spring-urged as by a spring 124 to a position in which the switch blade closes an electrical contact 126 and through the associated electric conduits 128 and 130, connected to any suitable source of electric power, not shown, is effective to control a circuit. As the level of the solid material 114 arises above the diaphragm 118, the latter will be depressed thereby opening the switch and breaking the electrical circuit. When the level drops below this member, however, the detecting device will allow the switch to close thereby restoring the electrical circuit.

This electrical circuit is connected to a solenoid valve 132 which is preferably disposed in the pressure air supply pipe 82. Consequently, when the conveying system has deposited a sufficient quantity of solid material in the collection chamber, the level detector or sensing means 116 will open the circuit, allowing the solenoid valve 132 to shut off the flow of pressure air through the pipe 82. This will stop further operation of the pneumatic conveying system until the level drops below the desired maximum and the switch will again close, restoring the electrical circuit, energizing the solenoid 132 and restoring flow to the pressure air supply pipe 82.

It will thus be observed that means are provided for automatically controlling the operation of the pneumatic conveying system to maintain thereby a substantially constant supply of solid material in the collector chamber of the device 18.

III. *Blockage removing means*

Figure 8:
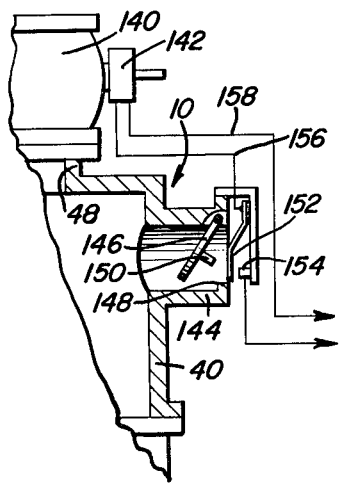
FIGURE 8 is a fragmentary view in section and showing a portion of the automatic blockage clearing means of the invention.
Figure 9:
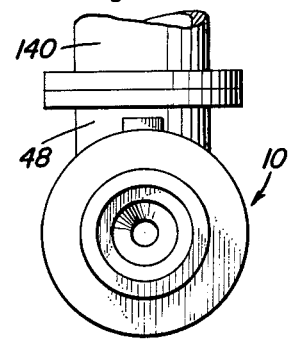
FIGURE 9 is a view of a portion of the blockage clearing means.

Referring next specifically to FIGURES 8 and 9 in conjunction with FIGURE 1 it is to be noted that this pneumatic conveying system also includes means for automatically clearing this system of stoppages arising from blockages occasioned by the accumulation of solid material in the passages of the system. For this purpose, there is provided a closure valve indicated generally by the numeral 140 and which is disposed in and forms a part of the solid material inlet sleeve 48. A solenoid 142 is connected to and operates this valve in any desired manner so that upon energizing the solenoid the valve will close the solid material inlet sleeve 48 to prevent further flow therethrough, while when the solenoid is deenergized, this passage will be again open for operation. Disposed in a wall of the uper section 40 of the mixing chamber 10 is an air inlet passage in the form of a boss 144. If desired, one of the previously mentioned bosses 52 may be utilized for this purpose. Disposed in the boss is a pivoted flap valve 146 cooperating with valve port 148 at the outer end of the boss. The valve is provided with an actuator projection 150 which cooperates with a movable leaf switch contact 152 cooperating with a stationary switch contact 154. The contacts 152 and 154 are connected to a pair of electrical conductors 156 and 158 by means of which electrical current from a suitable circuit, not shown, is supplied to the solenoid 142.

The arrangement operates as follows. In normal operation, the sub-atmospheric pressure in the mixing chamber will maintain the flap valve 146 in open position as shown in FIGURE 8. At this time, the switch accuating projection 150 will be withdrawn from the switch blade 152 so that the solenoid 142 will not be energized and the control valve 140 will thus be open. However, if an obstruction should occur in the conduit 16 or anywhere downstream from the mixing device 10, the resultant increase in back pressure within the device will close the valve 146. When this occurs, the projector 150 will operate the movable switch blade 152 and close the switch, thereby energizing the solenoid and closing the valve 140. Simultaneously with the closing of the valve 140, the full pressure of the air supplied from the pipe 82 will be applied to the conveyor system thereby raising the pressure therein from the much lower operating pressure to the maximum pressure of the air supply. This increase in pressure will blow out the obstruction thereby opening the passage of the system for further use. When the passage is again opened, the pressure will drop, the valve 146 will open and the solenoid will be deenergized permitting the sub-atmospheric pressure to again flow into the device.

IV. *Remote control means*

Figure 10:
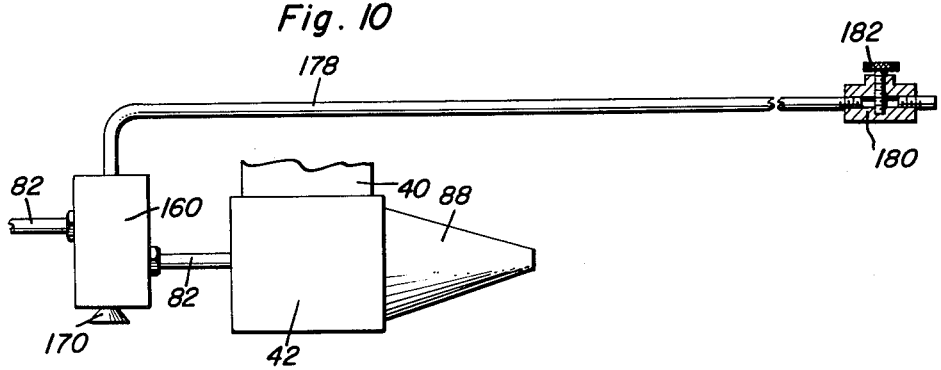
FIGURE 10 is a view partly diagrammatic and showing partly in elevation and partly in section remote pneumatic control means in accordance with this invention.
Figure 11:
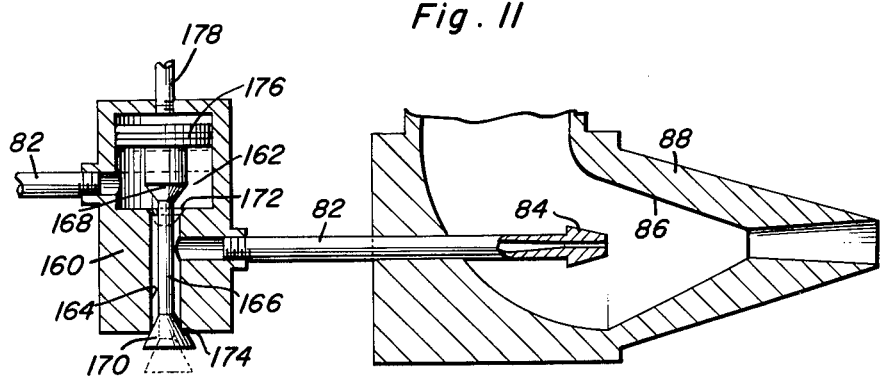
FIGURE 11 is a view in vertical section upon an enlarged scale of the control elements of FIGURE 10.

Referring next to FIGURES 10 and 11 in conjunction with FIGURE 1 it will be noted that the previously mentioned solenoid valve 132 which controls the supply of the pressure air to the pipe 82 is also controlled by a remote manual operating means. For this purpose, there is interposed in the pressure air supply conduit 82 a valve housing 160. This housing has a chamber 162 with which communicates a vent passage 164 opening into the atmosphere. Loosely and slidably receiving within this vent passage 164 is a valve stem 166 having conical valves 168 and 170 at its upper and lower ends respectively, these valves cooperating with corresponding valve seats 172 and 174 at the upper and lower ends of the vent passage 164. The valve stem is further provided with an actuating piston 176 slidable in the chamber 162. Extending into the chamber at the opposite side of the piston 176 is a conduit 178 which extends from any suitable remote location where it is connected to a manually operated control valve 180. The latter may conveniently comprise a thumb screw 182 which thus operates the venting of the passage 178 to the atmosphere as will be apparent from FIGURE 10.

The arrangement is such that when the remote control switch 180 which is located at any convenient position is manually operated to open the passage 178 to the atmosphere the pressure above the piston 176 will be vented whereupon the air pressure in the conduit 82 supplied to the chamber 162 will lift the piston 176, raise the valve assembly and cause the lower valve 170 to engage the valve seat 174 and thus close the vent to the atmosphere. At this time, the air pressure can flow through the chamber 162 and thus to the nozzle 84 within the jet element 88. However, when the manual valve member 182 is operated to close the passage 178 to the atmosphere pressure within the chamber 150 will gradually bypass the piston 176 allowing the latter to drop by gravity. This will cause the upper valve member 168 to close against the upper valve seat 172 cutting off further flow of pressure air into the mixing chamber. In addition, the lower valve 170 will leave its seat 174 thus venting the interior of the mixing chamber to the atmosphere and thereby stopping further flow through the pneumatic conveyor assembly.

V. *Chamber evacuating means*

In addition to functioning as a means for pneumatically conveying solid material from one place to another, the jet elements of this device may also function as a means to evacuate containers, reservoirs, chambers and the like. For this purpose, referring to FIGURES 12 and 13, it will be observed that the upper section 40 of the mixing device is disconnected from the lower sections 42, the latter being replaced by a suitable receptacle, container or device 184 which is to be evacuated. This device has a top wall 186 by which is secured to the flange 44 of the upper section 40 and the top wall 186 has an opening 188 which registers with the previously mentioned opening or openings 56, 58 of the upper housing section 40. The sleeve 48 is closed to the atmosphere and a pressure supply pipe 192 which may connect with the same sources or may constitute the same pipe 82 previously mentioned is inserted through the sleeve 48 and provided with discharge nozzles 194, each of which is directed closely adjacent to one of the bosses 50 and 52. The latter are provided with venturi elements as at 196 so that the pressure of the incoming air discharged into the venturi elements will result in a strong aspirating effect which will draw in air from the interior of the housing 40 and thus from the receptacle 184 secured thereto. In this manner, the mixing device may be reconverted so as to function as a vacuum pump for exhausting air from the chamber, container or receptacle.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A pneumatic conveyor system comprising a mixing device including a mixing chamber, a source of solid, granular material and a source of air under pressure each communicating with said chamber, a collection chamber into which solid material conveyed by said air is to be discharged, conveyor conduit means delivering a stream of air laden with solid, granular material from said mixing chamber to said collection chamber, a suction conduit means supplying air into said mixing chamber, an aspirating device in one of said conduit means introducing material into said air stream, a solid material level detecting means associated with said collection chamber sensing the level of solid material therein, a flow control means for said conveyor conduit means operable to selectively halt and permit flow of said conveyor air stream, means connecting said flow control means with said level detecting means and operating the former from the latter, a manually operable remote control connected to said flow control means and independently operating the latter, a blockage clearing means operatively connected to said mixing chamber and to said conveyor conduit means and responsive to a predetermined pressure rise therein to apply the full pressure of the air supply and discharge the blockage.

2. The combination of claim 1 wherein said mixing device comprises a pair of upper and lower housing sections, a pair of venturi jet mixing chambers in said lower section to each of which said source of air is connected, a solid material supply chamber in said upper section to which said source of solid material is connected, means distributing solid material from said supply chamber to said jet mixing chamber, means in said supply chamber delivering additional air to said venturi jet chamber.

3. A pneumatic conveyor system including an air and solid material mixing device, a collector and separator means, conduit means conveying solid material in an airborne stream from said mixing device to said collector and separator means, said mixing device including a solid material chamber and a mixing chamber, means for directing a stream of conveying air under pressure through said mixing chamber and into said conduit means, means for separately delivering solid material and additional air into said solid material chamber, separate passages delivering said solid material and said additional air from said solid material chamber into said mixing chamber.

4. The combination of claim 3 including a suction line connected to said solid material chamber, an aspirating device connected to said suction line.

5. The combination of claim 3 including an aspirating device connected to said conduit means.

6. The combination of claim 3 wherein said collector and separator means includes a collector chamber into which solid material is deposited from said conveying air stream, a level detecting device in said collector chamber, means controlling operation of said conveying air stream, means connecting said detecting device to said operation controlling means.

7. The combination of claim 3 including blockage detecting means responsive to pressure increases in said conveyor system produced by an obstruction, means sealing said system from the atmosphere operable by said detecting means whereby pressure increases produced by said stream of conveying air will expel said obstruction.

8. The combination of claim 3 including means controlling the flow of said conveying air into said mixing chamber including an air flow control valve, remote control means operatively connected to said flow control valve.

9. The combination of claim 8 wherein said flow control valve is exposed to and maintained open by the pressure of said conveying air, said remote control means effecting closing of said flow control valve and venting of said conduit means.

10. The combination of claim 3 wherein said mixing chamber comprises a chamber having an inlet adapted for connection to the exterior of said solid material chamber in communication therewith, a pair of exhaust openings for said mixing chamber, said means for directing a stream of conveying air including jet venturi communicating each with an exhaust opening, a jet nozzle in said chamber positioned adjacent each jet venturi and directing a stream of pressure air outwardly therethrough, and means for supplying air under pressure to said jet nozzles.

References Cited by the Examiner

UNITED STATES PATENTS

| 1,450,903 | 4/1923 | Newhouse | 302—42 |
| 1,935,843 | 11/1933 | Goebels | 302—53 |
| 2,544,011 | 3/1951 | Duvall | 302—35 |
| 2,716,050 | 8/1955 | Hagerbaumer | 302—53 |

FOREIGN PATENTS 361,119   10/1922   Germany.

EVON C. BLUNK, *Primary Examiner.*

ANDRES H. NIELSEN, *Examiner.*